(12) United States Patent
Tzvi et al.

(10) Patent No.: US 8,407,212 B2
(45) Date of Patent: Mar. 26, 2013

(54) SYSTEM AND METHOD FOR GENERATION OF A CUSTOMIZED WEB PAGE BASED ON USER IDENTIFIERS

(75) Inventors: Sol Tzvi, Herzliya (IL); Dotan Emanuel, Herzliya (IL); Amos Yoffe, Tel Aviv (IL); Tal Elad, Holon (IL); Yaron Fishman, Ramat Gan (IL)

(73) Assignee: GENIEO Innovation Ltd., Herzliya (IL)

( * ) Notice: Subject to any disclaimer, the term of this patent is extended or adjusted under 35 U.S.C. 154(b) by 65 days.

(21) Appl. No.: 12/714,006

(22) Filed: Feb. 26, 2010

(65) Prior Publication Data
US 2010/0299325 A1 Nov. 25, 2010

Related U.S. Application Data

(60) Provisional application No. 61/291,938, filed on Jan. 4, 2010, provisional application No. 61/213,254, filed on May 20, 2009, provisional application No. 61/213,450, filed on Jun. 10, 2009.

(51) Int. Cl.
*G06F 7/00* (2006.01)
(52) U.S. Cl. ........................................ 707/723
(58) Field of Classification Search .............. 707/705, 707/709, 736, 767, 768, 723
See application file for complete search history.

(56) References Cited

U.S. PATENT DOCUMENTS

| | | | |
|---|---|---|---|
| 5,786,815 A | 7/1998 | Ford | |
| 6,052,714 A | 4/2000 | Miike et al. | |
| 6,085,219 A | 7/2000 | Moriya | |
| 6,199,067 B1 | 3/2001 | Geller | |
| 6,236,978 B1 | 5/2001 | Tuzhilin | |
| 6,266,056 B1 | 7/2001 | Kanungo | |
| 6,292,796 B1 | 9/2001 | Drucker et al. | |
| 6,317,734 B1 | 11/2001 | Zellweger | |
| 6,327,590 B1 | 12/2001 | Chidlovskii et al. | |
| 6,351,272 B1 | 2/2002 | Kanungo et al. | |
| 6,380,955 B1 | 4/2002 | Kanungo et al. | |
| 6,397,219 B2 | 5/2002 | Mills | |
| 6,424,968 B1 | 7/2002 | Broster et al. | |
| 6,498,567 B1 | 12/2002 | Grefenstette et al. | |
| 6,513,039 B1 | 1/2003 | Kraenzel | |
| 6,571,279 B1 | 5/2003 | Herz et al. | |
| 6,581,072 B1 | 6/2003 | Mathur et al. | |
| 6,714,778 B2 | 3/2004 | Nykanen et al. | |
| 6,895,406 B2 | 5/2005 | Fables et al. | |
| 6,996,768 B1 | 2/2006 | Elo et al. | |
| 7,030,890 B1 | 4/2006 | Jouet et al. | |
| 7,035,863 B2 | 4/2006 | Kurapati et al. | |

(Continued)

FOREIGN PATENT DOCUMENTS
WO 2008/101248 8/2008

OTHER PUBLICATIONS

URL: https://addons.mozilla.org/en-US/firefox/addon/4689 Retrieved: Feb. 12, 2010.

(Continued)

*Primary Examiner* — Amy Ng
(74) *Attorney, Agent, or Firm* — Myers Wolin, LLC (57) ABSTRACT

A system for generating a customized web page is provided. The system comprising an identifier generator and manager (IGM) for generating a plurality of identifiers from data collected respective of usage of information by a user over time and for providing an answer responsive to a query. The query answer is based on the plurality of identifiers. Also provided is an auto-discovery and management unit for determining relevancy to the user of information retrieved from an information source in which the determination is based on answers received from the IGM and a web page generator for generating a web page containing at least a snippet of the relevant information in a designated display area of the generated web page.

15 Claims, 9 Drawing Sheets

U.S. PATENT DOCUMENTS

| | | | |
|---|---|---|---|
| 7,043,475 B2 | 5/2006 | Heer et al. |
| 7,086,002 B2 | 8/2006 | Elo et al. |
| 7,089,216 B2 | 8/2006 | Van Overveld |
| 7,092,936 B1 | 8/2006 | Alonso et al. |
| 7,103,642 B1 | 9/2006 | Chen et al. |
| 7,113,088 B2 | 9/2006 | Frick et al. |
| 7,113,741 B2 | 9/2006 | Chuberre et al. |
| 7,162,522 B2 | 1/2007 | Adar et al. |
| 7,249,124 B2 | 7/2007 | Sasaki et al. |
| 7,251,687 B1 | 7/2007 | McCullough |
| 7,293,019 B2 | 11/2007 | Dumais et al. |
| 7,454,461 B2 | 11/2008 | Punaganti Venkata et al. |
| 7,512,569 B2 | 3/2009 | Isaacs |
| 7,523,137 B2 | 4/2009 | Kass et al. |
| 7,536,320 B2 | 5/2009 | McQueen, III et al. |
| 7,596,759 B2 | 9/2009 | Verna |
| 2003/0101024 A1 | 5/2003 | Adar et al. |
| 2003/0126227 A1 | 7/2003 | Zimmerman et al. |
| 2003/0236770 A1 | 12/2003 | Kurapati et al. |
| 2006/0026113 A1 | 2/2006 | Omoigui |
| 2006/0064411 A1 | 3/2006 | Gross et al. |
| 2006/0230021 A1* | 10/2006 | Diab et al. | 707/3 |
| 2006/0248059 A1 | 11/2006 | Chi et al. |
| 2007/0027932 A1 | 2/2007 | Thibeault |
| 2007/0073681 A1 | 3/2007 | Adar et al. |
| 2007/0073682 A1 | 3/2007 | Adar et al. |
| 2007/0083468 A1 | 4/2007 | Wetherell |
| 2007/0094346 A1 | 4/2007 | Nussey |
| 2007/0100959 A1 | 5/2007 | Eichstaedt et al. |
| 2007/0112749 A1 | 5/2007 | Huang et al. |
| 2007/0162432 A1 | 7/2007 | Armstrong et al. |
| 2007/0168367 A1 | 7/2007 | Dickinson et al. |
| 2007/0208704 A1* | 9/2007 | Ives | 707/3 |
| 2007/0239518 A1 | 10/2007 | Chung et al. |
| 2007/0260624 A1 | 11/2007 | Chung et al. |
| 2008/0010294 A1 | 1/2008 | Norton et al. |
| 2008/0046313 A1 | 2/2008 | Chen |
| 2008/0162510 A1 | 7/2008 | Baio et al. |
| 2008/0162537 A1 | 7/2008 | Mancini |
| 2008/0222132 A1 | 9/2008 | Pan et al. |
| 2008/0295006 A1 | 11/2008 | LuVogt et al. |
| 2008/0313147 A1* | 12/2008 | Svore et al. | 707/3 |
| 2009/0063537 A1 | 3/2009 | Bonnefoy-Cudraz et al. |
| 2009/0077033 A1 | 3/2009 | McGary et al. |
| 2009/0171754 A1 | 7/2009 | Kane et al. |
| 2009/0171755 A1 | 7/2009 | Kane et al. |
| 2009/0171968 A1 | 7/2009 | Kane et al. |
| 2009/0172021 A1 | 7/2009 | Kane et al. |
| 2009/0172551 A1 | 7/2009 | Kane et al. |

OTHER PUBLICATIONS

URL: http://feedrinse.com/ Retrieved: Feb. 12, 2010.
URL: http://www.feedscrub.com/ Retrieved: Feb. 12, 2010.
URL: http://www.my6sense.com/website/a/MainPage Retrieved: Feb. 12, 2010.
Hu, Jian et al., "Demographic Prediction Based on User's Browsing Behavior", WWW 2007 / Track: Data Mining; Session: Predictive Modeling of Web Users; May 8-12, 2007, Banff, Alberta, Canada, pp. 151-160.
Teevan, Jaime et al., "Personalizing Search via Automated Analysis of Interests and Activities", SIRGIR '05, Aug. 15-19, 2005, Salvador, Brazil.
Ahn, Jae-wook et al., "Open User Profiles for Adaptive News Systems: Help or Harm?", WWW 2007 / Track: Browsers and User Profiles; Session: Personalization; May 8-12, 2007, Banff, Alberta, Canada, pp. 11-20.
Belkin, Nicholas J., "Helping People Find What They Don't Know", Communications of the ACM, vol. 43, No. 8, (Aug. 2000); pp. 58-61.
Liu, Ying, "Chapter 1: On Document Representation and Term Weights in Text Classification", IGI Global, pp. 1-22; published 2009.
Shafiei, Mandi et al., "A Systematic Study of Document Representation and Dimension Reduction for Text Clustering", Technical Report CS-2006-05, Jul. 11, 2006, Faculty of Computer Science, 6050 University Ave., Halifax, Nova Scotia, B3H 1W5, Canada.
Kelly, Diane et al., "Implicit Feedback for Inferring User Preference: A Bibliography", ACM SIGIR Forum, vol. 37, Issue 2 (Fall 2003), pp. 18-28.

* cited by examiner

SYSTEM AND METHOD FOR GENERATION OF A CUSTOMIZED WEB PAGE BASED ON USER IDENTIFIERS

CROSS-REFERENCE TO RELATED APPLICATIONS

This application claims the benefit of U.S. provisional application No. 61/291,938 filed on Jan. 4, 2010; U.S. provisional application 61/213,254 filed on May 20, 2009; and U.S. provisional application 61/213,450 filed on Jun. 10, 2009, the contents of which are herein incorporated by reference.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention relates generally to automatic providing of information to a user, and more specifically to systems and methods for providing a personalized home page that provide the user information for a web browser that is based on automatically gathered user characteristics, registration to information sources and information gathering from the various sources.

BACKGROUND OF THE INVENTION

Users have today a possibility to reach and be reached by a vast amount of information on a variety of user devices. Such user devices include telephones, handheld devices, personal computers (PCs), personal digital assistants (PDAs), and the like. The information may be provided to the user in a push mode, that is, information is provided to the user without a specific action on the user's side. In general, the user attempts to receive relevant information that provides the user with significant insights into the areas of interest to the user. Known in the industry are widgets that are elements of a graphical user interface (GUI) that displays information in a form that is editable by the user. Once the user installs a widget the information is provided to the user from the widget.

The widget that are pushing information may be tempting initially, however, may become quickly tiresome. The information may become less relevant to the user, may be disruptive at certain times of the day or week, or just be clattered with relevant and irrelevant information, as is often the case. The user has no way to order the information by importance or the filtering out of information that is not relevant to the user needs.

It would be, therefore, advantageous to provide a solution to render information in a manner which is customized for the user and that is based on perceived user needs.

SUMMARY OF THE INVENTION

Certain embodiments of the invention include a system for generating a customized web page. The system comprises an identifier generator and manager (IGM) for generating a plurality of identifiers from data collected respective of usage of information by a user over time and for providing an answer responsive to a query, wherein the answer is based on the plurality of identifiers; an auto-discovery and management unit for determining relevancy to the user of information retrieved from an information source, wherein the determination is based on answers received from the IGM; and a web page generator for generating a web page containing at least a snippet of the relevant information in a designated display area of the generated web page.

Certain embodiments of the invention further include a method for automatically generating a customized web page. The method comprises generating identifiers based on a user usage of information over time, wherein the identifiers provide unique identifications respective of a user; receiving information from at least one information source; determining whether the received information is relevant for the user based on the identifiers; generating a web page that contains at least a snippet of the relevant information; and displaying the web page on a display.

Certain embodiments of the invention also include an apparatus comprising a storage medium and capable of generating and storing a customized web page. The wherein the customized web page comprises at least an item corresponding to an area of interest of a user of the customized web page selected based on at least an identifier of the user; at least a thumbnail of a web site of interest to the user of the customized web page selected based on at least an identifier of the user; and at least a topic corresponding to an area of interest of a user of the web page selected based on at least an identifier of the user.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

FIG. 10 is a blog web page designated for sharing items derived from the personalized web page over a period of time.

DETAILED DESCRIPTION OF THE INVENTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments of the invention allow to provide personalization of a home page of a web browser based on user identifiers. The user identifiers are collected in order to enable identification of preferences of the user, preferably as a user profile. Based on the identifiers of a user, a home web page, a blog web page, or a newsletter is dynamically created and thereafter updated. The personalized web page or the newsletter is divided into a plurality of sub-areas that highlight both objective and subjective presences of information with respect of the user's identifiers. The personalized web page provides information to the user that may include news, widgets, e-mails, games and the likes. The information in the homepage includes textual information, pictures, videos and the likes.

Figure 1:
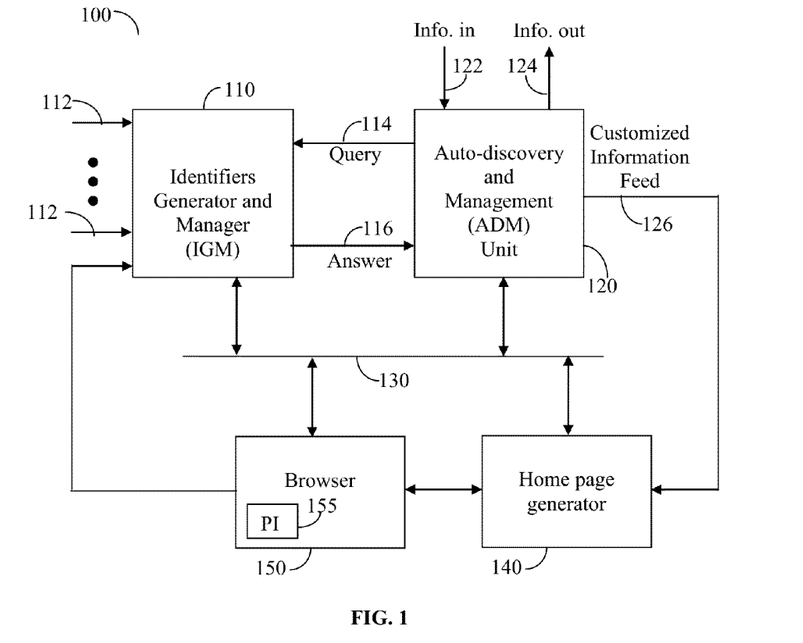
FIG. 1 is a schematic block diagram of an architecture of a system in accordance with the principles of the invention.

FIG. 1 depicts an exemplary and non-limiting schematic block diagram of a system 100 implemented in accordance with the principles of the invention. An identifier generator and manager (IGM) 110 is enabled to generate identifiers that provide unique identifications respective of a user. Identifiers may be uniquifiers and an uniquifier generator and manager (UGM) 410 is described herein below in more detail providing an insight into an exemplary and non-limiting embodiment of an IGM 110. In one embodiment of the invention the identifiers comprise together a user profile representing the user that is using the system.

The auto-discovery and management unit 120 is capable of collecting information, for example, news, widgets, and other sources of information, from a plurality of sources, including but not limited to sources that are frequently visited by the user. The collection is done, for example, by means of interfaces information out 124 and information in 122. For example, for the purpose of discovery and/or registration the system 100 tracks the browsing history of the user and automatically registers and/or associates the user with feeds, web pages and the likes that the user browsed and showed interest in. Then, using the identifiers determined by the IGM 110 and through a process of query 114 and answer 116, determining the importance of the information and relevancy thereof, to the user. It may be further determined the specific context the user may be, for example, information relevant during work hours may be different from information during other times.

The unit 120 is further capable of determining if the information provided is objective information of importance or subjective information of importance. This is done by defining information that was determined by an external source as being objective. Therefore, the unit 120 defines as objective information such information that was, for example, determined by a news editor as being of high importance based, for example, on the information being in the first few items of news displayed as at least a portion of a home page or web portal. This news is correlated also with the identifiers of the user to determine the relevancy to the user and if so is determined to be objective information of relevance to the user. Other news, which was not objectively determined as being of high importance is also processed by the unit 120 and may be determined as being of interest to the user. However, these are subjective pieces of news, as they may be interesting to the particular user but not considered to be interesting on a more general basis.

The customized information gathered by the unit 120 and determined to be relevant to the user is provided to the home page generator 140 that generates a web page, preferably a local home page, for a particular browser of choice that can display the gathered information. The customized information may include customized information feeds (e.g., RSS feeds, RSS 2.0, ATOM syndication format, and so on) that are input to the home page generators through an interface 126. The teachings of generating customized information feeds are provided below. A browser 150 connected to the home page generator 140 is capable of displaying the generated web page on an appropriate display (not shown) of the system 100. The browser 150 is further equipped with plug-in (PI) sensors 155 that may be used by the IGM 110 as an input and to further refine the identifiers of the user.

According to the principles of the invention, the objective information is displayed in one area of the home page while the subjective information is displayed in another area of the home page, such that the two types of information are displayed distinctively from each other in different areas of the page. An interface 130 enables the transfer of information between the IGM 110, unit 120, home page generator 140 and browser 150 as may be necessary for the proper operation of the disclosed system. The plug-in (PI) sensors 155 provide sensory information from the browser 150 to the IGM 110 by means of sensor interfaces 112.

While a home page is described herein, this should not be viewed as a limitation, and other web pages, e.g., blog web pages, may be used for this purpose. It should be further noted that the home page generator 140 may periodically refresh and update the objective display area and the subjective display area with new information gathered by the unit 120, which may add, delete or differently position any portion of the information displayed. In one embodiment of the invention the system generates periodically a newsletter that comprises both objective and subjective display areas that can be shared with other users. For example, it may contain a plurality of items in each of the display categories that are ranked highest in that period of time.

Figure 2:
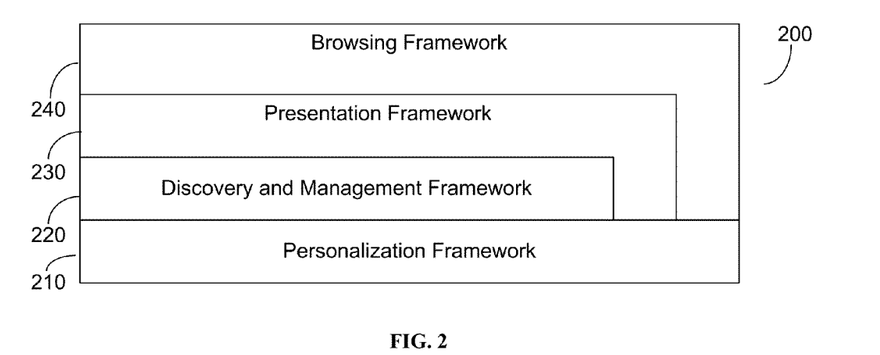
FIG. 2 is a schematic diagram describing of the different layers of the system.

FIG. 2 provides a schematic diagram 200 that describes the operational layers of the system 100. The personalization framework 210 provides personalization services, e.g., the identifiers that provide characteristics of the user of the system as shown with respect to the IGM 110. The discovery and management framework 220 contacts the personalization framework 210 to enable the application of the identifiers as characterizing the user to determine information that is of relevance to the user based on the system and user requirements.

The presentation framework 230 is responsible for the generation of a web home page presentable by a browser that has a layout that provides the user with desirable information presented prominently and is further able to accept communication from the user. The browsing framework 240 presents to the user the personalized home page and is further enabled to provide sensory information to the personalization framework 210. It should be noted therefore that the personalization framework 210 receives information from various user sensors, performs semantic analysis, and builds, if applicable, a user profile. The discovery and management framework 220 identifies feeds that are relevant to the user, periodically fetches the feeds and filters their content, monitors hot trends and fetches hot data relevant to the user according to the user profile, and, fetches relevant video/audio content from a mired of sources such as, but not limited to, Youtube®, Facebook® and other sources.

The presentation framework 230 taps the discovery and management framework 220 for data to be displayed to the user which include, but are not limited to, feed items determined to be of interest to the user, top portal headlines, topics relevant to the user profile, and shortcuts to recently accessed information. The browsing framework 240 presents the personalized homepage to the user, sends user actions respective of the personalized homepage to the presentation framework 230, and sends sensory information about the user's activity to the personalization framework 210.

It should therefore be appreciated that generally, the personalization framework 210 corresponds to the IGM 110, the discovery and management framework 220 to the unit 120, the presentation framework 230 to the home page generator 140 and the browsing framework 240 to the browser 150 and the PI sensors 155. It should be further appreciated that the information platform system 100 can present information from a mired of sources that are customized and personalized automatically as explained herein. Furthermore, while the presentation of feeds, widgets, games, advertisement, and so on is described herein, it should be also understood that they may fade out in a similar way as the web page gets updated and the relevance of becomes lesser to the user. In one embodiment of the invention the system 100 auto-discovers sources of data that may be or are trusted by the user, filters the data based on the user's behavior and interest and auto-creates widgets, for example but with no limitation, with topics, pictures, videos, twits and news items such as Facebook®, Youtube®, television shows, and so on.

Figure 3:
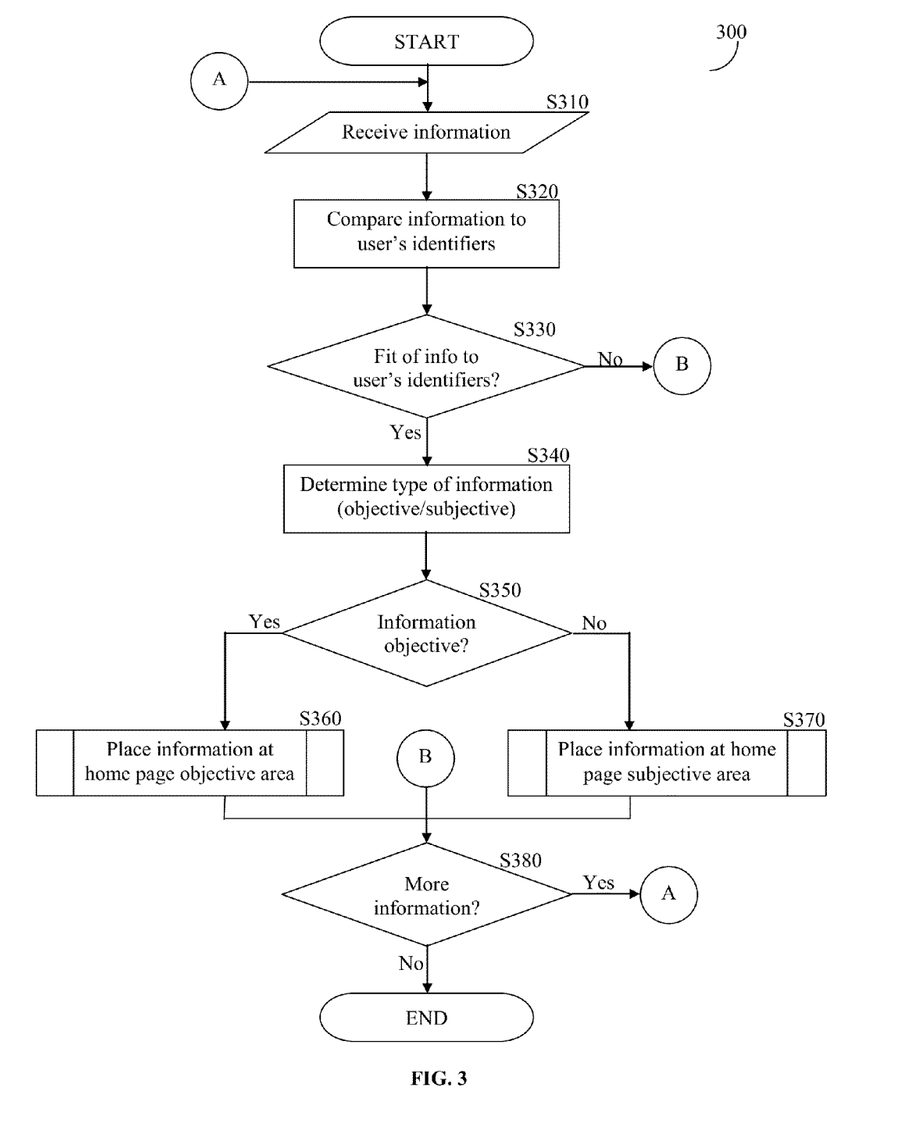
FIG. 3 is a flowchart describing the process of creating a home page for information gathered for a user in accordance with the principles of the invention.

FIG. 3 depicts an exemplary and non-limiting flowchart 300 describing the process of creating a home page for information gathered for a user in accordance with the principles of the invention. In S310 information is received by the system, for example the unit 120 of system 100. In S320 the information is compared against the user's identifiers, a user profile, and/or uniquifiers. The identifiers maybe generated for the user in IGM 110. In S330 it is checked if the information received has a degree of fit with the identifiers of the user, the user profile, and/or uniquifiers. If so execution continues with S340; otherwise, execution continues with S380.

In S340 the type of information is determined as further explained above, i.e., whether the information received is of an objective nature or a subjective nature. The information may then be tagged, for example, by means of metadata, as being of one type or another. In S350 it is checked whether the information is objective, and if so in S360 the information is placed in the home page to be displayed to a user in the display area for objective data. In one embodiment this information may be further ranked to ensure it is displayed at a position which generally would fit the importance a user may give to such information based on, for example, the user's identifiers (and in one embodiment with the user profile).

If S350 results with a 'No' answer, then in S370 the information is placed in the home page to be displayed to a user in the display area for subjective data. In one embodiment this information may be further ranked to ensure it is displayed at a position which generally would fit the importance a user may give to such information based on, for example, the user's identifiers (and in one embodiment with the user profile). In S380 it is checked whether additional information is to be received and if so execution continues with S310; otherwise, execution terminates.

It should be noted that S360 and S370 may further enable additional functionality with respect to the display of information to the user. For example, ranking may take place at each refresh cycle of the display of the page so as to update the position of any given piece of information to suit the change in information input, time decay, change in an interest of the user, the user context, the source of the information or origin thereof, and the likes.

The display of information in each display area, subjective or objective may be further accompanied with a snippet of information from the sourced information. In practice not the entire information may be shown in such a snippet. To determine the most desirable snippet a plurality of potential snippets from an information source may be generated and then checked against the identifiers, the user profile, and/or uniquifiers of the user, using again the process of query 114 and answer 116 to determine the snippet which would best fit the user's identifiers, the user profile, and/or uniquifiers. This ensures that information displayed to the user in a display area will also be most meaningful to the user based on the user's own dynamically changing identifiers, the user profile, and/or uniquifiers.

Figure 9:
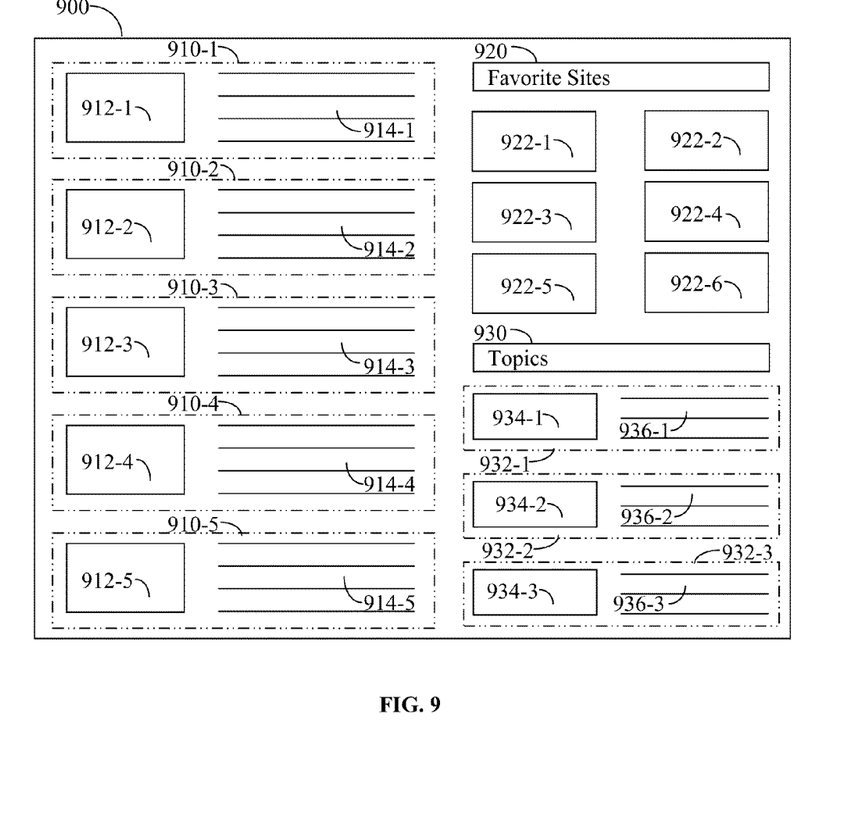
FIG. 9 is a schematic layout of a customized home page in accordance with the principles of the invention.

An exemplary and non-limiting layout of a customized home web page 900 of objective and/or subjective data displayed on a browser is shown in FIG. 9. A plurality of items 910, preferably comprising of an image 912 and a corresponding snippet 914, are displayed on the home page 900. For example, an item 910-1 comprises an image 912-1 and a corresponding to snippet 914-1. The selection of which item 910 is displayed is based on the principles discussed hereinabove, for example with respect to FIG. 3. Based on the user's identifiers, and/or user profile, and/or uniquifiers, the selection of the item 910 and ranking in the list to be displayed is determined. In one embodiment of the invention the items 910 are selected such that there is a distribution between different topics determined to be of interest to the user based on the user's identifiers, and/or user profile, and/or uniquifiers. The personalized home page 900 may further contain thumbnails 922 of favorite sites 920 of the user. A favorite site, for example site 922-1, may be selected based on the popularity of use by the user. However, in one embodiment of the invention a favorite site may be determine for the user based on the user's identifiers, and/or user profile, and/or uniquifiers and/or navigation history.

The personalized home page 900 may further include a section of topics 930. In one embodiment of the invention a home page may be a web portal. A topic is an area of interest identified based on unlabeled identifiers of the user. An unlabeled identifier is information respective of the user that typically cannot be labeled in advance of the collection of information. For example, the age, name, geographic zone, and other similar items are labeled identifiers as they can be easily determined in advance of the operation of gathering information about the user. When the information is available it is easily associated with the desired label. Other information, for example interest in a specific sport event or specific music instrument, are unlabeled identifiers as it is not known in advance that such a topic should be even identified, and even if it is, the information leading to the deduction is at best indirect and unclear.

A topic 932, for example topic 932-1, preferably comprises an image 934-1 representative of the unlabeled topic, and a description 936-1 determined to be descriptive of the topic 932 based on the user's identifiers, and/or user profile, and/or uniquifiers. A click on a topic opens another home web page that provides a plurality of items, such as items 910, corresponding solely to the topic. This enables a user to get additional items respective of a topic of interest to the user. Specifically, by clicking on the desired topic the user will be able to access items 910 determined to be of interest to the user on the topic basis but that have not made it as a topic 910 of the home page 900 main page. The home web page 900 generated is embodied in a storage medium for viewing and manipulation through a display on which the home page is displayed, and other input and output components made available thereto.

Figure 4:
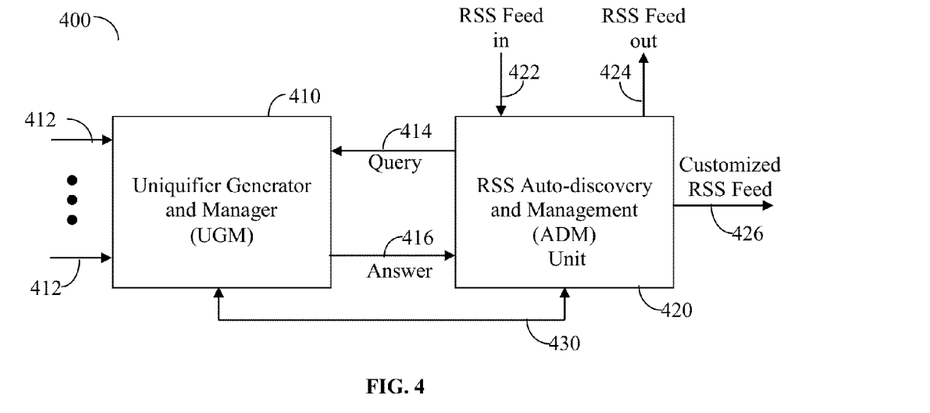
FIG. 4 is a schematic block diagram of an architecture of a system for automatic registration to RSS feeds.

FIG. 4 shows an exemplary and non-limiting schematic block diagram of a system 400 constructed in accordance with the principles of the invention. The system 400 comprises of an uniquifier generator and manager (UGM) 410 and an auto-discovery and management (ADM) unit 420. The system 400 may be embodied in a user device such as, but not limited to, a personal computer (PC), a personal digital assistance (PDA), a mobile phone, a smart phone, and the like. The UGM 410 receives a plurality of sensory information through sensor inputs 412 and generates uniquifiers of two types, one type is the labeled uniquifiers (LUs) and the other type is the unlabeled uniquifiers (UUs). An uniquifier is a piece of information that provides unique information about the user of the user device. The UGM 410 receives queries through interface 414 and provides answers thereto through interface 416.

The ADM unit 420, is enabled to provide queries to UGM 410 respective of information streams, and specifically information streams that are RSS feeds. By extracting data from the RSS feed, the ADM unit 420 generates a query to the UGM 410 checking whether such data fits the uniquifiers of the user using a user device. Based on the answers provided by the UGM 410 to ADM unit 420, the unit 420 may register to a RSS feed that is potentially of interest to a user based on the user's uniquifiers. Conversely, the ADM 420 unit, when appropriate, relinquishes registration to the RSS feed when the user's interests change as shown based on the uniquifiers or other checks as further described below. Moreover, a user profile that is a combination of uniquifiers, may change over time, it may be time of day, day of week, and other basis for change, even, for example, the football season for sports but not outside of that period. That is, the user profile is used at a different context of the user use of the user device. The change of a user profile may impact the retrieval of data from a RSS feed. Furthermore, as data is provided from a RSS feed that the user was registered to by the system 400, it is possible to check if such data is of interest to the user based on the user's uniquifiers, by presenting queries to UGM 410. As the operation of the system 400 continues sensory information is gathered through the sensor inputs 412 and hence a continuous feedback loop is provided. Therefore, if a user shows certain interest in some RSS feed data over others, this will in turn impact the user's uniquifiers as detected by the UGM 410 and hence refine the type of data the user receives from RSS feeds. A person with ordinary skill in the art would readily realize that the system 400 is a private case of the more general system 100 described hereinabove. Specifically, in an embodiment of the invention, the UGM 410 is an implementation of IGM 110 and the unit 420 is a private case of the discovery and management unit 120 described hereinabove.

Figure 5:
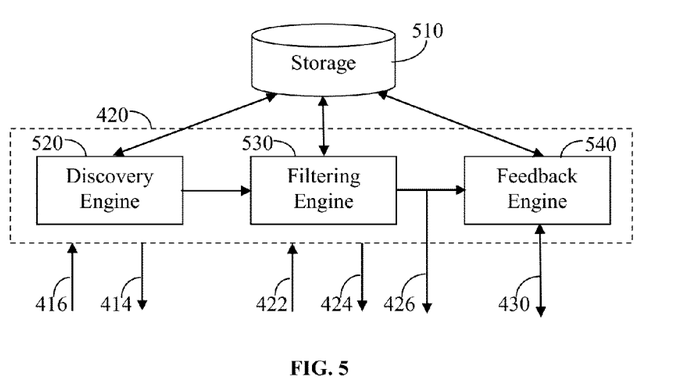
FIG. 5 is a detailed block diagram of auto-discovery and management (ADM) unit.

FIG. 5 shows an exemplary and non-limiting block diagram 500 depicting the ADM unit 420 internals. The ADM unit 420 is comprised of three engines: a discovery engine (DE) 520, a filtering engine (FE) 530 and a feedback engine (FBE) 540. Data from each of these engines may be exchanged with a storage device 510. The DE unit 520 is responsible for creating a list of information streams, such as RSS feeds, and selecting those feeds which are potentially of interest to the user of the user device. A more detailed discussion of the operation of the DE 520 is provided with respect of FIG. 6. The list of approved information streams is provided to FE 530 and included the approved information streams as well as their respective registration information.

The FE 530 can log on and off of each and every approved information stream and filter the data that is provided by that stream. The FE 530 exchanges data with RSS feed services through interfaces 422 and 424. Data output from the FE 530 is provided to the user device for the purpose of, for example, display on the user device over interface 426. A detailed discussion of the operation of FE 530 is provided with respect of FIG. 7.

The data provided by the FE 530 is also provided to the FBE 540 that is responsible of checking the user's response to the data provided by the FE 530. Such monitoring of responses may be done by using the sensory information provided by the UGM 410 over an interface 430, or otherwise by other means that enable the tracking of the user interaction with the data being supplied. By monitoring the actual usage made by the user of the user device it is possible to determine if it is necessary to maintain a registration to a feed or it better be removed from the approved list of information streams. A more detailed discussion of the operation of the FBE 540 is provided with respect of FIG. 8.

Figure 6:
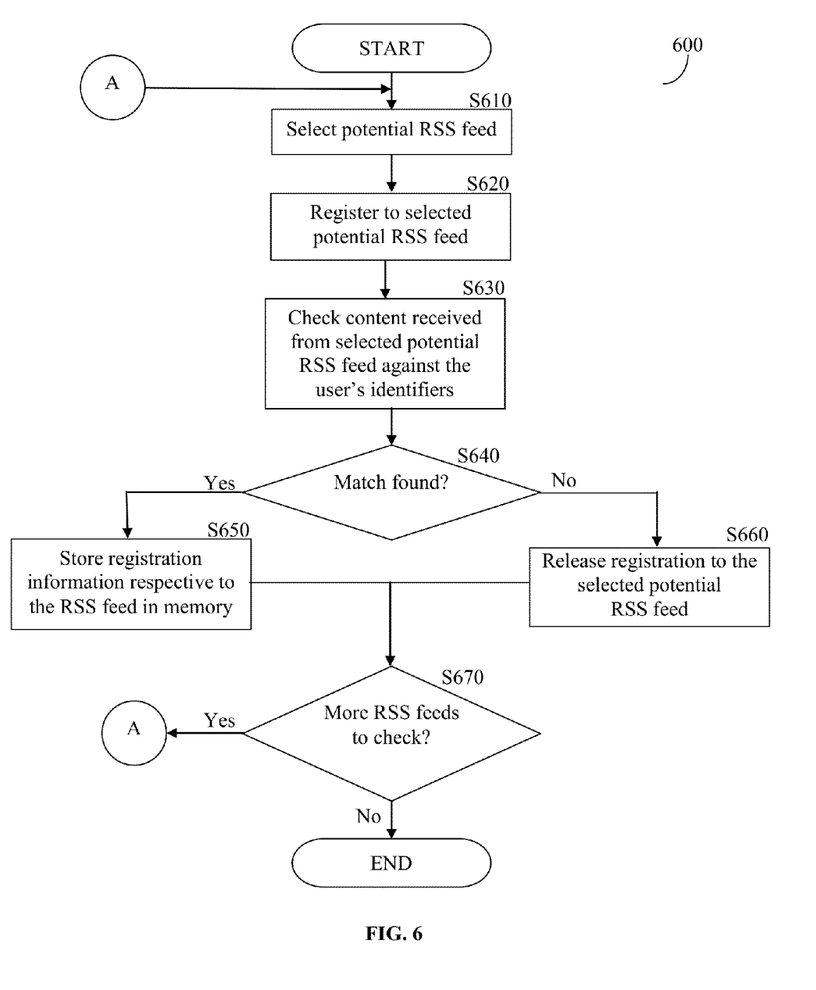
FIG. 6 is a flowchart depicting the process of discovery of RSS feeds in accordance with the principles of the invention.

FIG. 6 depicts an exemplary and non-limiting flowchart 600 of the process of discovery of RSS feeds implemented in accordance with the principles of the invention that is performed by DE 520. It should be noted that while RSS feeds or sources are mentioned specifically with respect of this exemplary embodiment, other information feeds may benefit from the principles discussed herein below, as well as with respect to FIGS. 7 and 8 below, and such should not be viewed as limiting upon the scope of the invention.

In S610 an RSS feed is selected from a plurality of possible RSS feeds. The list of possible RSS feeds may be provided to the ADM unit 420 from an external source, or otherwise developed by the ADM unit 420 by, for example and without limitation, by, for example, crawling web pages for detection of RSS feeds. In S620 the selected RSS feed is registered to by DE 520, automatically, without involvement of the user, thereby relieving the user from any need or knowledge of such registration. In S630 data is received from the registered potential RSS feed. The data received from the potential RSS feed is checked against the uniquifiers of the user by accessing the UGM 410 by means of a query over interface 414 and receiving answers over interface 416.

In S640 it is checked whether the answer received from the UGM 410 with respect to the query for the data received from the potential RSS feed matches one or more of the user's uniquifiers, and if so execution continues with S650; otherwise, execution continues with S660. In S650 DE 520 stored the registration information of the potential RSS feed, now being a qualified RSS feed, in a selected RSS feed list, stored for example in the storage device 510. Such a qualified RSS feed is expected to have content that, according to the check made, fits the user needs. In S660 the RSS feed, found in S640 not to match user needs, is released either permanently or temporarily by either disconnecting from the RSS feed and maintaining the registration or otherwise, by completely canceling registration to that the RSS feed.

In one embodiment of the invention an additional period of monitoring the data provided from the RSS feed is provided, so as to check the relevance of the feed for the user of the user device over an extended period of time. By doing so, it is ensured that the user receives RSS feed content which is relevant to the user's needs. In S670 it is checked whether more RSS feeds are to be checked, and if so execution continues with S610; otherwise, execution terminates. It should be noted that while uniquifiers are used with respect to the above mentioned descriptions, identifiers or other user profile attributes may be used for this purpose without departing from the scope of the invention.

Figure 7:
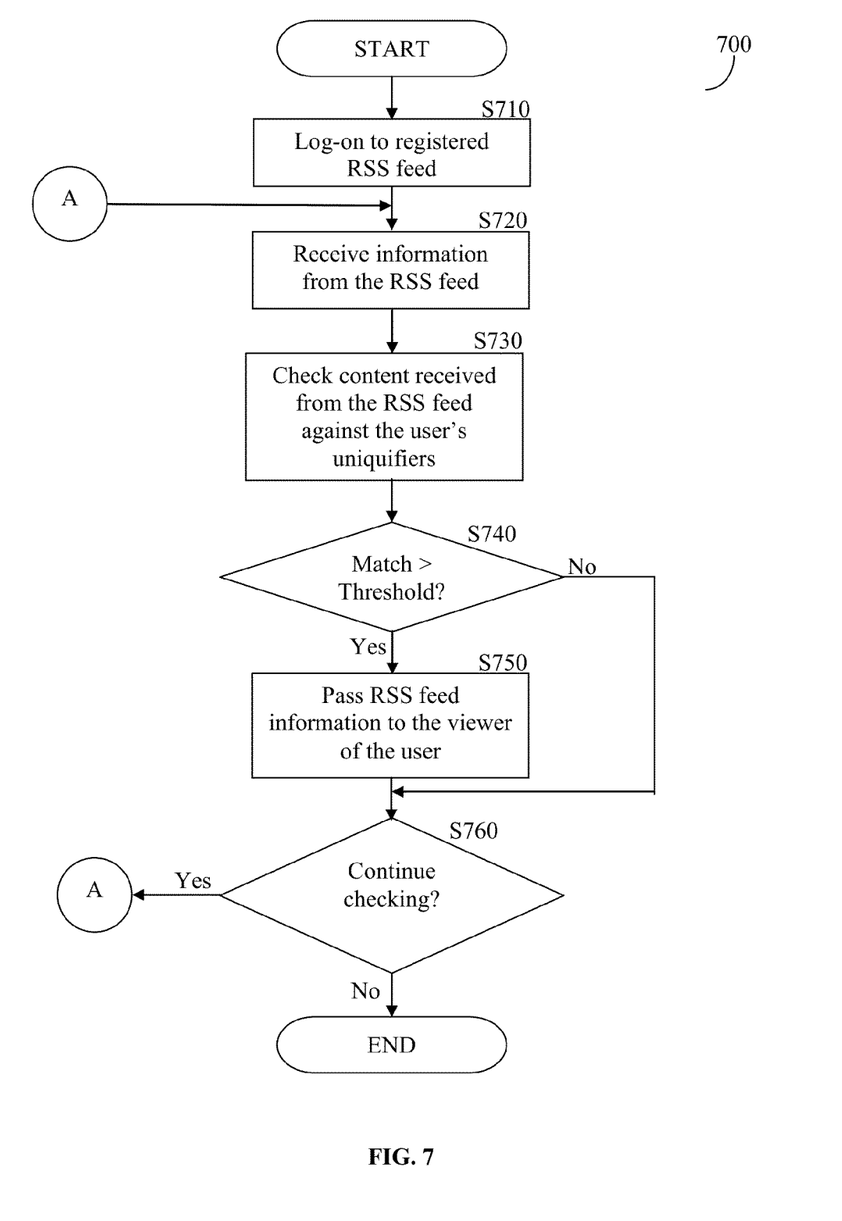
FIG. 7 is a flowchart depicting the process of filtering content of RSS feeds prior to display in accordance with the principles of the invention.

FIG. 7 shows an exemplary and non-limiting flowchart 700 depicting the process of filtering content of RSS feeds prior to display implemented in accordance with the principles of the invention, by the FE 530. In S710 a RSS feed from the list of approved RSS feeds provided by DE 520 is logged on, based on the information in the list. In S720 data is received from the RSS feed and in S730 the data is checked against the uniquifiers of the user as discussed in more detail hereinabove. In S740 it is checked if the match between the data and the uniquifiers of the user of the user device is above a predetermined threshold value and if so execution continues with S750; otherwise, execution continues with S760. In S750 the RSS feed data is provided to the user, for example for the purpose of viewing by the user. In S760 it is checked if it is necessary to continue filtering data from the RSS feed and if so execution continues with S720; otherwise, execution terminates.

It should be noted that this process may be repeated for each and every of the registered and approved RSS feeds. In one embodiment, and as further noted hereinabove, as the user profile changes from one profile, for example the workday profile, to the night profile, the RSS feeds provided for that profile may differ and hence different RSS feeds will be logged on and others be logged off.

Figure 8:
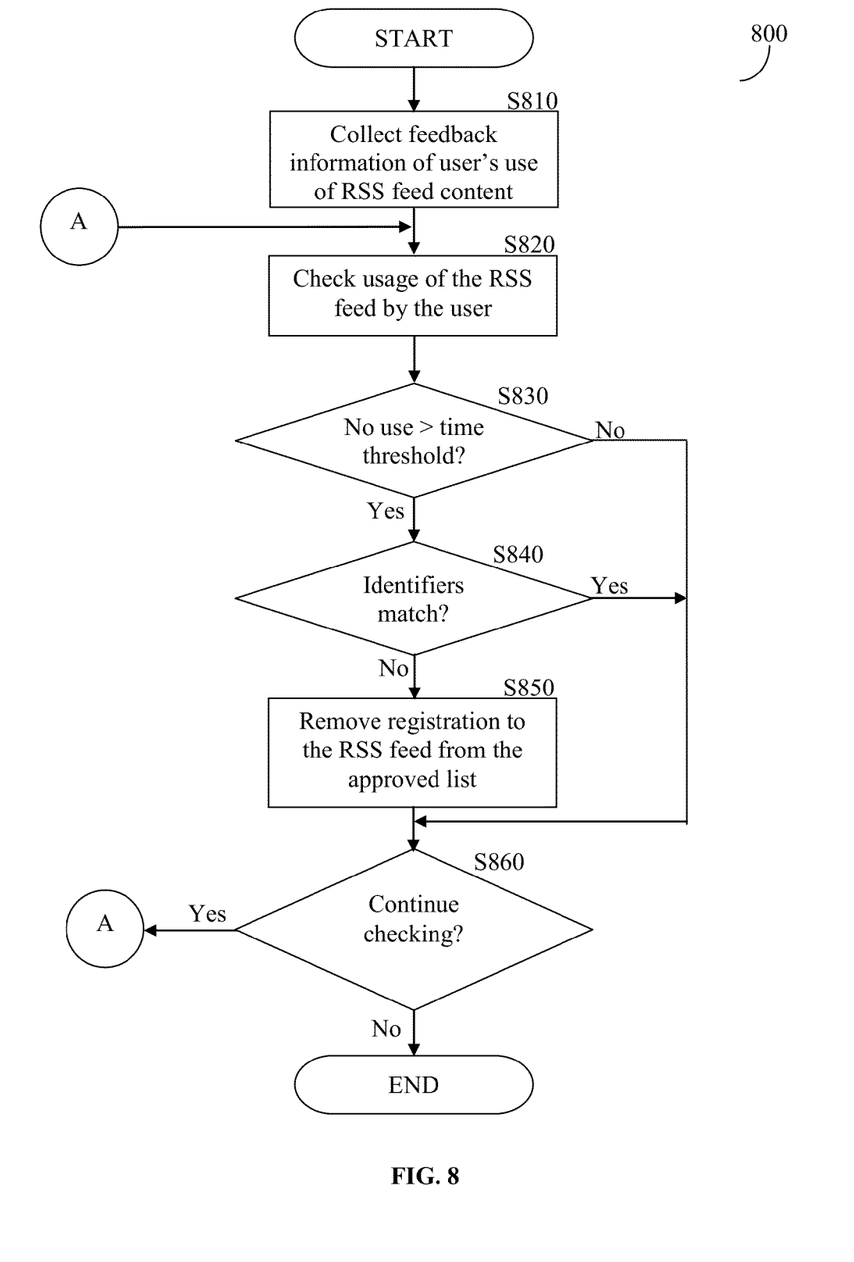
FIG. 8 is a flowchart depicting the process of monitoring the use by a user of RSS feeds and responding thereto in accordance with the principles of the invention.

The operation of the FBE 540 is depicted in FIG. 8 an exemplary and non-liming flowchart 800 of the process of monitoring the use by a user of RSS feeds and responding thereto implemented in accordance with the principles of the invention. In S810 feedback information respective of the user usage of the RSS feed content by a user of the user device is collected. Once sufficient information is collected then in S820 the usage pattern is checked. The usage pattern may include information such a frequency of access, level of interest, and more, in order to generate specific parameters for checking the usability level of the RSS feed. S830 and S840 are merely an example of checks that may be performed by the FBE 540, other tests to determine specific usage patterns of interest in such a system 400 would be apparent to one of ordinary skill in the art.

In S830 it is checked if there was no use of information provided by the RSS feed for a period of time exceeding a time threshold, and if so execution continues with S840; otherwise, as the data from the RSS feed was used, execution continues with S860. In S840 it is checked whether the data provided by the RSS feed still maintains a high uniquifier match, or at least a match above a predetermined threshold, and if so execution continues with S860 as the data may still be relevant to the user in the future; otherwise, execution continues with S850.

In S850 the registration to the RSS feed is removed from the approved RSS feed list as it is determined that the RSS feed is not valuable for the user of the user device. Providing this feature automatically without the intervention of the user provides a significant benefit to the user, as the user is not required to manually perform such a removal. In S860 it is checked if the process should continue and if so execution continues with S820; otherwise execution terminates. The process may be repeated for each RSS feed independently.

To further explain the functionality according to the invention several practical non-limiting examples are now provided. As noted above, in certain embodiments, the process concerning the operation carried by the system 400 comprises of: a) registering to a wide range of optional RSS feeds; b) filtering relevant data and presenting it to the user; and, c) collecting feedback and fine tuning the RSS feed list by removing filtered feeds and learning which methods provide the most relevant feed to the users for future registration. These steps are repeated throughout the operation of system 400. All operations are performed in conjunction with the UGM 410 that provides feedback for the selection of RSS feeds and content thereof. Therefore the system 400 automatically manages the registration and un-registration of RSS feeds in a manner corresponding to the user areas of interest based on the user's identified uniquifiers. The system 400 further filters incoming RSS items and displays only items relevant to the user based on the user's uniquifiers. Furthermore, the system 400 tracks its success, measured by the level of interest the user shows with respect to the RSS items presented, and adjusts its RSS discovery registration, removal and filtering strategy, based at least in part on the user's uniquifiers.

For the purpose of RSS feeds' discovery and registration the system 400 tracks the browsing history of the user and automatically registers the user to an RSS feed of any web page that the user browsed and showed interest in. In addition to checking the uniquifiers this may be further determined by identification of a longer stay time, bookmarking of a page, digging for additional information respective of the page viewed, sending a link of the page to another person, repeated visits to the web page, and more. The system 400 may further search entire web sites corresponding to a universal resource locator (URL) that the user commonly visits, for the purpose of finding RSS feeds not otherwise presented. Using, for example, global uniquifiers (GU, the system 400 may perform active search for a user area of interest using the user's profile and registering the best RSS that comes up as a result from this search. This further enables the system 400 to register the user to RSS feeds used by other users with similar uniquifiers. A GU is a synthetic uniquifier that is created by assuming certain terms that are expected to be part of a GU.

In one embodiment RSS feed lists are provided from other users that grant the system permission to use their respective RSS lists. In another embodiment of the invention, the system 400 registers the user to sites of popular news, audio or video items, for example, digg (www.digg.com), Youtube® most popular, Twitter trends, Google trends, and the like. In yet another embodiment of the invention the system 400 receives a list of recommended RSS feeds for specific topics from a central server dedicated for providing recommendations as to popular or relevant RSS feeds. This can be matched against the user interests based on the user's uniquifiers and upon a match the system 400 registers the user to those RSS feeds. Similarly, the system 400 may register the user to RSS feeds of blogs, for example blogs of friends and social circles as extracted from the user's social web network. These include but are not limited to, Facebook®, Twitter®, web mail and the likes. The selection may be further filtered using the uniquifiers of the user to ensure that the RSS feeds of the blogs are actually those that the user is interested in receiving.

The collected RSS feeds are filtered, typically using the UGM 410 to assess the relevance to the user of the user device by means of a query and reception of an answer. The system 400 therefore collects data items received from the different RSS feeds. When data items description is short, the system 400 fetches the complete article to get a better understanding of the content of the item, for example by checking it against the uniquifiers of the user using UGM 410. When data items are not textual the system retrieves tags and other metadata that describe the content item, e.g., author, subject, popularity, description, which may then be checked against the user's uniquifiers. When a data item is of a specific type, such as video or audio, the system 400 searches open media databases, such as IMDB and the likes, to collect metadata information and tags about the item. The metadata information and tags may then be used to match with the user's uniquifiers. In the process the system 400 removes duplicate items and presents them as a single item. The system 400 presents the full item with metadata information to the personal profile filter, e.g., the UGM 410, and in response gets an answer which may be a score indicating the level of interest the user is expected to have for the checked data item. The system 400 displays to the user the data items with the best scores for the different interests the user may have and collects feedback about the user actions on each item as discussed hereinabove. In one embodiment of the invention the system 400 further enables the user to request more information of the same subject, overriding the score given by UGM 410.

The system 400 naturally collects feedback by using the sensor inputs 412. In the feedback loop the system 400 collects the user feedback, implicitly or explicitly, respective of the selected data items provided by a RSS feed. This feedback may be further used by the UGM 410 to provide an updated score for the RSS feed, in response to a query respective of the RSS feed. The score represents the value of the specific RSS feed to the user. The score varies over time as a RSS feed that was valuable, for example, last week might not be valuable in a preceding week. Feeds with high score are considered to be valuable RSS feeds. The score is built using many parameters but one of the most important factors is the ratio of good items versus the ratio of spam items that passed the filter, in a sense a merit of a signal to noise ratio as far as the user is concerned. The system tracks this ratio over time. In accordance to an embodiment of the invention the system 400 automatically unregisters non valuable RSS feeds. The system 100 further tracks the logic that lead to the registration of valuable feeds, and puts more emphasis on those methods for the specific user in future RSS feed discovery and registration.

FIG. 10 depicts an exemplary and non-limiting blog web page 1000 of a blog post designated for sharing items which are derived from a personalized web page over a period of time. There are various areas in the blog page that include the blogger's personal note area 1010 where the blogger can add comments to the blog. An area 1020 for the top news items that were of interest to the blogger and other areas, such as area 1030 for denoting worthwhile visiting web sites and area 1040 for top ranked video clips. An area 1050 is used by peoples that access the user blog to add their comments to the automatically generated user blog. Other areas may be added or used in replacement of the areas noted above. However, it should be noted that all information in the automatically generated blog web page 1000 result from the user's interaction with information and according to the uniquifiers or identifiers derived for this user.

Figure 11:
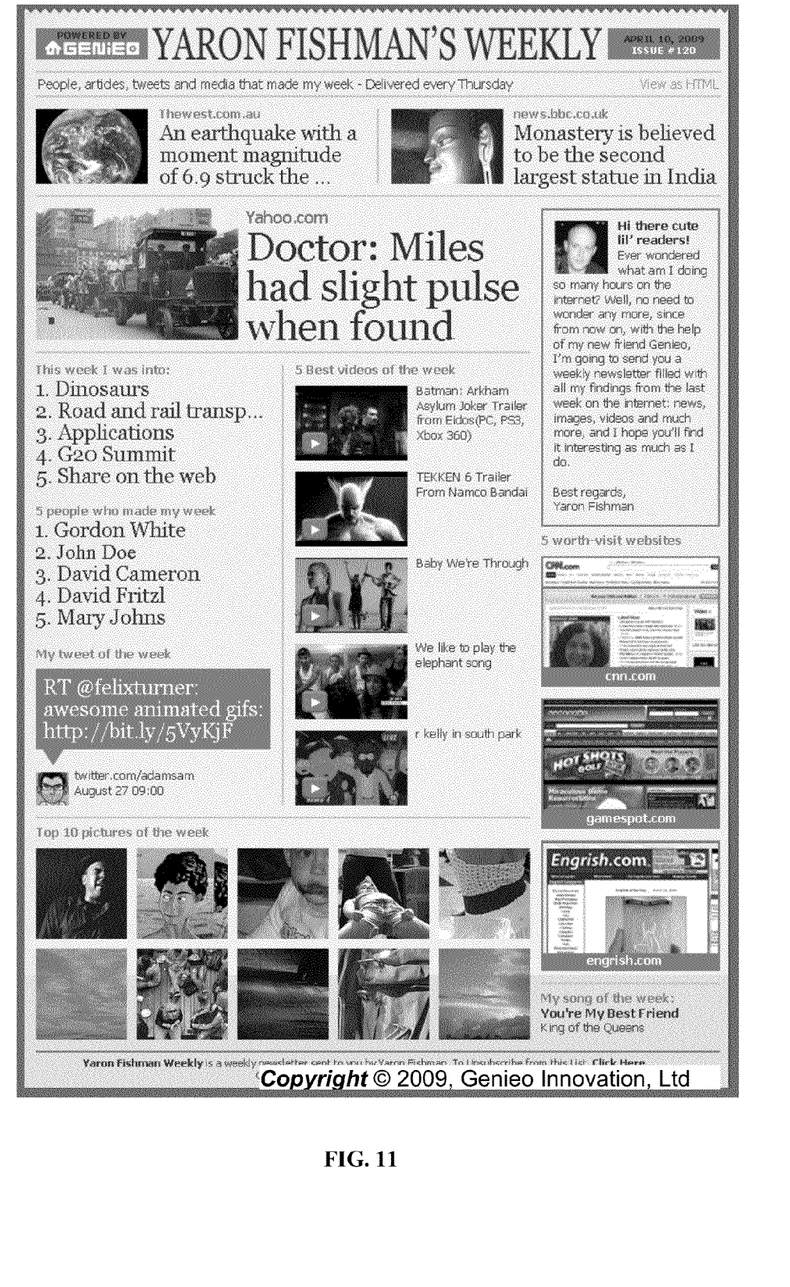
FIG. 11 is a newsletter derived from the personalized web page in accordance with the principles of the invention.

Sharing or otherwise posting of the blog web page may be done, for example and without limitation, by making it available on a generally accessible bloggers' web site that enables the creation of blogs for users. Accordingly, the system 100 could be enabled to post the blog to the auto blogging RSS feed on a blog web site, having an area unique for the user. Other means of sharing such content are explicitly included herein and would be obvious to those of regular skill in the art. These include, without limitations, the periodic distribution in the form of, for example, a newsletter, to a distribution list, using means such as e-mail or multimedia data exchange systems of a variety of sorts. FIG. 11 depicts an exemplary and non-limiting newsletter derived from the personalized web page over a predefined period of time. This newsletter can be sent to a distribution list using means such as e-mail.

The principles of the invention may be implemented in hardware, firmware, software or any combination thereof. Moreover, the software is preferably implemented as an application program tangibly embodied on a program storage unit, computer readable medium or machine readable medium that may consist of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory and/or other tangible storage mediums, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A system for generating a customized web page, comprising:
   an identifier generator and manager (IGM) for generating a plurality of uniquifiers uniquely characterizing a user from data collected respective of usage of information by a user over time and for providing an answer responsive to a query, wherein the answer is based on the plurality of uniquifiers and a user profile;
   an auto-discovery and management unit for determining relevancy to the user of information retrieved from an information source, wherein the determination is based on answers received from the IGM;
   determining at least one snippet of the relevant information by checking a plurality of potential snippets of the information against the plurality of uniquifiers and the user profile to determine which snippet is relevant for display;
   a web page generator for generating a web page containing the at least one determined snippet of the relevant information in a designated display area of the generated web page, wherein the designated display area the display area contains a first display area for objective information and a second display area for subjective information, the objective information being ranked high by an external source and deemed relevant to the user based on the user uniquifiers and the user profile, and the subjective information being information that is either unranked or of low ranking by the external source but have a high ranking based on the user uniquifiers and the user profile; and
   a non-transitory computer readable storage medium to store data collected.

2. The system of claim 1, wherein the generated web page refreshes periodically.

3. The system of claim 1, wherein the web page is one of a web portal, a start page of a web browser, and an automatically generated blog post.

4. The system of claim 1, wherein the system is integrated in at least one of a personal computer (PC), a personal digital assistant (PDA), a mobile phone, a smart phone.

5. The system of claim 1, wherein at least a portion of the content of the web page is distributed periodically as a newsletter to a distribution list.

6. A method for automatically generating a customized web page, comprising:
- generating identifiers based on a user usage of information over time, wherein the identifiers uniquely characterizing a user;
- receiving information from at least one information source;
- determining whether the received information is relevant for the user based on the identifiers and a user profile;
- determining at least one snippet of the relevant information by checking a plurality of potential snippets of the information against the identifiers and the user profile to determine which snippet is relevant for display;
- generating a web page including a designated display area that contains the at least one snippet of the relevant information, wherein the designated display area contains a first display area for objective information and a second display area for subjective information, the objective information being ranked high by an external source and deemed relevant to the user based on the identifiers and the user profile, and the subjective information being information that is either unranked or of low ranking by the external source but have a high ranking based on the identifiers and the user profile; and
- displaying the web page on a display.

7. The method of claim 6, further comprising:
- periodically refreshing the web page with newly received information.

8. The method of claim 6, further comprising:
- determining whether the relevant information is the objective information or the subjective information and placing the objective information into the first display area of the web page and the subjective information into the second display area.

9. The method of claim 6, wherein the web page is one of a web portal, a start page of a web browser, and an automatically generated blog post.

10. The method of claim 6, further comprising:
- generating a newsletter comprising at least a portion of the content of the web page; and
- distributing the newsletter periodically to a distribution list.

11. The method of claim 6, wherein the identifies are generated by an identifiers generator and manager (IGM), the relevancy of information is determined by an auto-discovery and management unit, the web page is generated by a web page generator, and the web page displayed by a web browser.

12. The method of claim 1, is executed by computer executable code stored in a non-transitory computer readable medium.

13. An apparatus comprising a non-transitory computer readable storage medium, wherein the apparatus is configured to generate and store a customized web page, the customized web page is stored in the non-transitory computer readable storage medium, wherein the customized web page comprising:
- at least one item corresponding to an area of interest of a user of the customized web page selected based on at least a user profile and an identifier of the user based on a user usage of information over time, the identifier uniquely characterizes a user of a device, wherein the at least one item is displayed with a corresponding snippet, wherein the least one snippet is determined by checking a plurality of potential snippets of the information against the identifiers and the user profile to determine which snippet is relevant for display;
- at least a thumbnail of a web site of interest to the user of the customized web page selected based on at least the user profile and the identifier of the user; and
- at least a topic corresponding to an area of interest of a user of the web page selected based on at least an identifier of the user.

14. The apparatus of claim 13, wherein the customized web page is one of a web portal, a start page of a web browser, an automatically generated blog post, and a newsletter.

15. The apparatus of claim 13, further being capable displaying on a display of a user device.

* * * * *